Dec. 12, 1939.　　　W. D. HUFF　　　2,183,454
POWER TRANSMISSION OR CLUTCH
Filed April 21, 1938　　　3 Sheets-Sheet 1

Inventor
William D. Huff
By Wilkinson & Mawhinney
Attorneys

Dec. 12, 1939.  W. D. HUFF  2,183,454

POWER TRANSMISSION OR CLUTCH

Filed April 21, 1938  3 Sheets-Sheet 2

Inventor
William D. Huff
By Wilkinson & Mawhinney
Attorneys

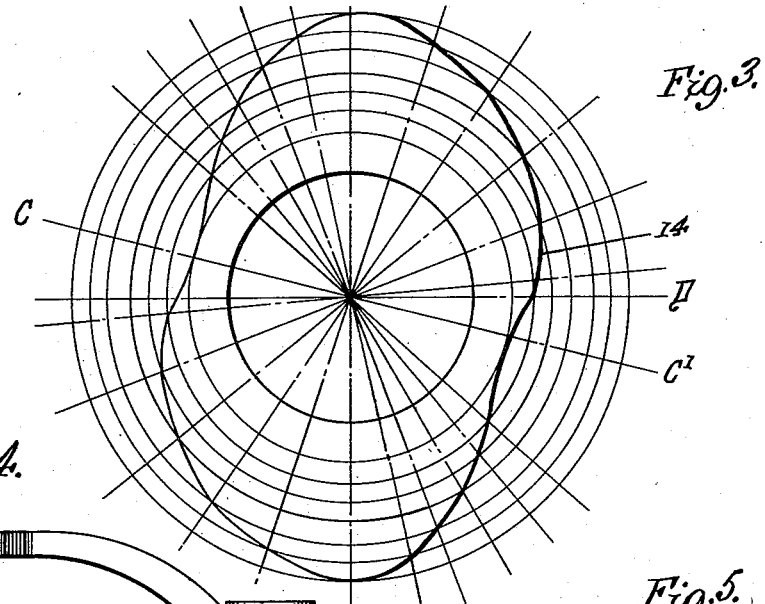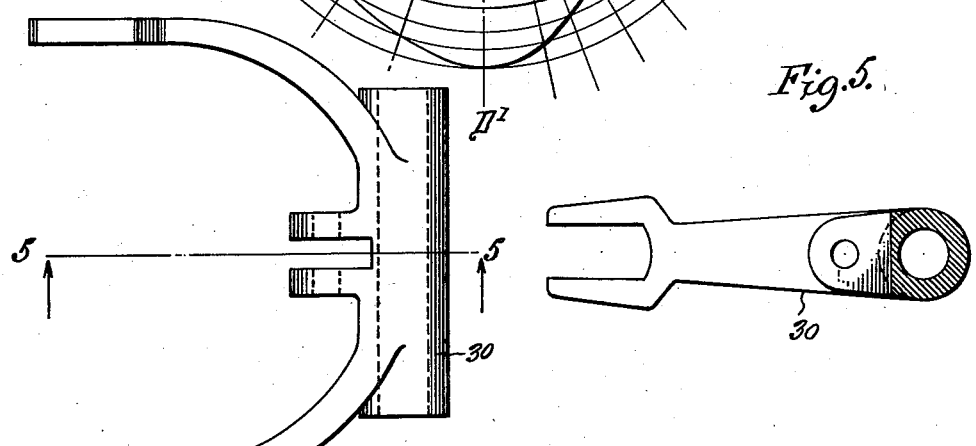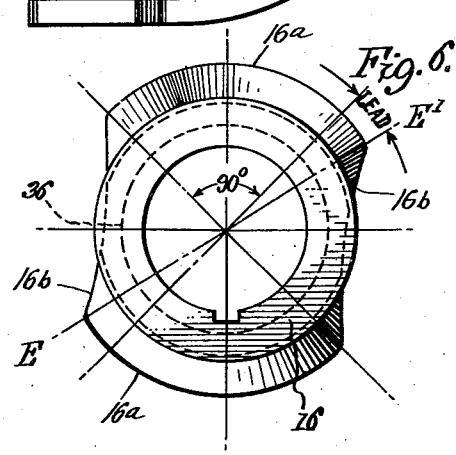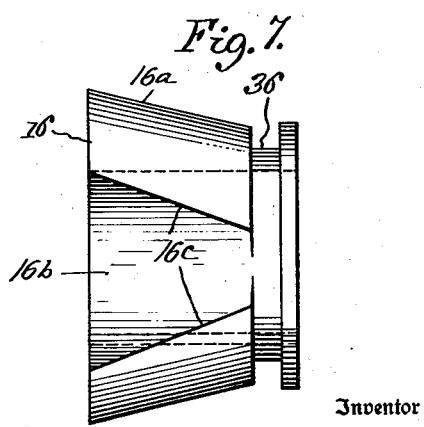

Patented Dec. 12, 1939

2,183,454

UNITED STATES PATENT OFFICE 2,183,454

POWER TRANSMISSION OR CLUTCH

William D. Huff, Lafayette, La.

Application April 21, 1938, Serial No. 203,449

11 Claim. (Cl. 192—60)

The present invention relates to improvements in power transmissions and clutches, and relates generally to that class of device employing reciprocating pistons carried about in rotating cylinders from which fluid is excluded or to which it is admitted under restriction to couple the driver to the follower.

The purpose of the invention is to improve the mechanical operation of such devices to effect the general objections of smoother operation and more perfect balance whereby the device may more effectively function as a fly-wheel.

Another object of the invention is to introduce into the construction cams of peculiar formation so angularly set with respect to one another that they will balance the actions of the parts and move efficiently to cut off and restrict the flow of the fluid to the cylinders and pistons.

A further object of the invention is to provide for reciprocating cylinders in conjunction with abutments whereby the cylinders themselves act to diminish the port area or to close the ports altogether when the driver is to be locked to complete engagement or direct drive with the follower member.

A still further object of the invention is the simplification of the mechanical arrangement and its close grouping into a simply operating and efficient clutch and transmission unit which will provide smooth and continuous drive throughout all progressive phases of the drive ratios.

With the foregoing and other objects in view, the invention will be more fully described hereinafter, and will be more particularly pointed out in the claims appended hereto.

In the drawings, wherein like symbols refer to like or corresponding parts throughout the several views:

Figure 2 is a vertical central section taken on the line 2—2 in Figure 1.

Figure 3 is a front elevation of the main cam showing its development.

Figure 4 is a plan view of the cylinder operating fork.

Figure 5 is a cross section taken on the line 5—5 in Figure 4.

Figure 6 is a plan view of the control cam.

Figure 7 is an edge view of the same, and

Figure 8 is a fragmentary sectional view, taken on an enlarged scale, of the meeting portions of the cylinder and abutment, and showing a slight modification.

Figure 1:
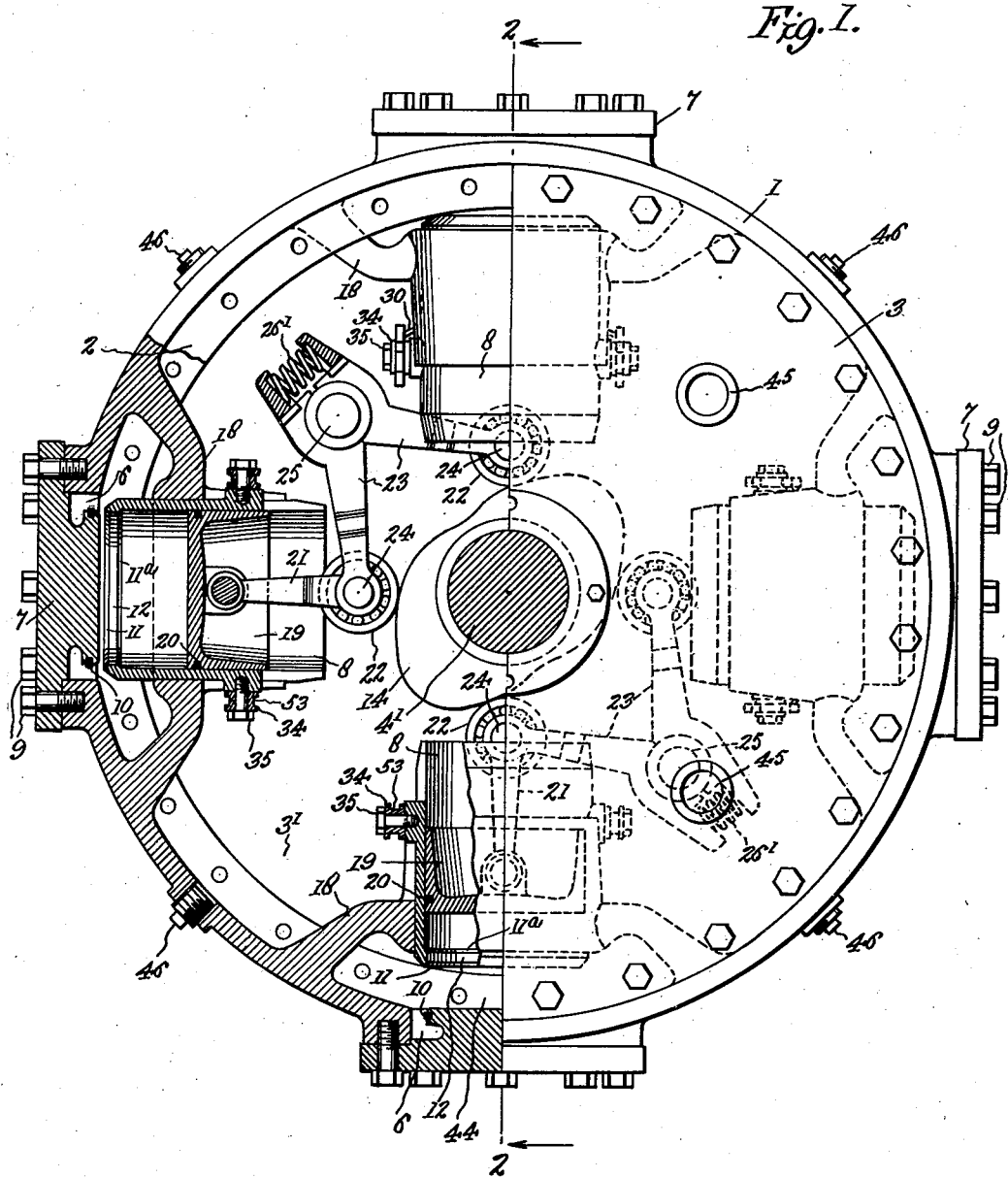
Figure 1 is a front elevation, with parts broken away and parts shown in section, of an improved power transmission and clutch constructed in accordance with the present invention.

Referring more particularly to the drawings, 1 designates a drum or a drum-shaped member which may be formed of a ring casting, recessed and machined, as indicated at 2 and 2', for receiving and centering the margin portions of the heads 3 and 3' which enclose the drum and enable it to hold water, oil or other fluid customarily employed in transmissions of this character.

This drum is driven by the drive shaft 4, the drive shaft 4 having a flange 5 bolted or screwed to the head 3' of the drum. The drum has a number of openings 6 distributed around its periphery. Four such openings are shown in the drawings. These openings 6 are slightly larger in diameter than the outside diameter of the cylinders 8. Heads 7 are fitted to the openings and held in place by the cap screws 9. Such heads have inner reduced parts carrying packing rings 10. The rings 10 and the reduced parts of the heads form circular abutments to receive thereagainst the beveled edges 11 of the reduced ring portions 12 of the cylinders 8.

In other words the beveled edge 11 of the outwardly moving cylinder 8 will first encounter the compression ring 10 and compress said ring whereby the reduced area 12 of the cylinder may fit tightly about said ring 10 whereby to exclude fluid from either entering or being expelled from the cylinder 8.

In this connection attention is called more particularly to the enlarged view of the meeting portions of the cylinder and abutment as shown in Figure 8. In this view the bevel edge 11 on the interior of cylinder 8 extends all the way out to the external wall of said cylinder and there is no external bevel on the cylinder as shown, for instance, in Figure 2. The external bevel on cylinder 8 of Figure 2 is without mechanical significance.

Figure 8 shows that the bevel edge 11 is a leading edge moving in advance of the restricted area 12 which is a flat area. In other words, the area 12 is substantially parallel with the interior and exterior walls of the cylinder 8. It is also substantially parallel with the vertical wall of abutment 7 whereby the flat restricted surface will mate with the flat vertical wall of abutment 7 in which the ring 10 is mounted. The restricted area 12 is of sufficient vertical extent to span the groove in which the compressible compression ring 12 is mounted.

Figure 8 also shows the interior area 11ª which is also a bevel area. The area 11ª is, however, shorter in a direction of the axis of cylinder 8 as compared with bevel area 11. In other words the area 11ª is shorter and more abrupt than the bevel area 11 which is longer and less sharp. Both areas 11 and 11ª slope inwardly of the inner wall of cylinder 8 to the restricted flat surface 12. These bevel areas combined with the restricted area 12 are designed to compensate or balance the pressure of fluid against cylinder 8 when being forced through the restricted area between the bevel portion 11 and the rounded portion of head or abutment 7.

The driven shaft or follower is shown at 4', and is centrally supported in the drum, as by the ball bearings 13 and 13. The ball bearings 13 are supported in a recess in the head 3. The ball bearings 13' are supported in a recess in head 3'. The driven shaft 4' carries the main driving cam 14 which may be made integral therewith or separately made and united fixedly thereto. The driven shaft 4' has a reduced extension 15 lying beyond the cam 14. The reduced end 50 of the shaft extension 15 is journaled in the ball bearings 13'. Such extension 15 is machined to slidably receive thereon the cone cam 16. Axial sliding movement of the cam 16 is permitted along the key 17 but the cam is keyed to the driven shaft and is compelled by the key 17 to rotate therewith. The control cam 16, being on a machined extension 15 of the driven shaft 4' which carries the main cam 14, both such cams will be in proper alinement with one another.

The drum 1 also carries guides 18 which may be cast integral with the drum. These guides are of the same number as the cylinders, preferably four and they form mountings in which the cylinders 8 are free to slide in radial directions with respect to the axis of the drum and the axes of the drive and driven shafts are coincident. The guides 18 are also preferably alined with the openings 6 in order to hold the cylinders 8 in position whereby such cylinders will properly fit over the heads 7. The pistons are indicated at 19 and carry packing rings 20 in order to make a substantially fluid tight fit with the cylinder walls. The connecting rods for the pistons are shown at 21, the same being bifurcated and carrying ball bearing rollers 22 bearing upon the periphery of the main cam 14.

Rocker arms 23 pivot about the pins 24 which connect the inner ends of such rocker arms with the inner ends of the connecting rods 21 and serve also as centers about which the rollers 22 rotate over the cam surface. The rocker arms operate in pairs, as shown in Figure 1. The two arms 23 of each pair oscillate about a pin 25 affixed to the head 3'. The tail pieces of the rocker arms 23 are constantly forced apart by a coil spring 26' to hold the rollers 22 against the periphery of the driving cam 14.

As shown more particularly in Figure 2, push rods 26 are slidably mounted in brackets 51 affixed to the head 3'. At their inner ends the push rods carry canted or inclined ball bearing rollers 27 positioned in contact with the cone-shaped control cam 16. The inner ends of the push rods 26 are bent so that the surfaces of the rollers 27 are in alinement with the conical surface of the cam 16 to permit such cam 16 to be adjusted longitudinally or axially along the follower shaft extension 15.

Stops 28 on the push rods 26 engage parts of the brackets 51 in the inner positions of the push rods when the rollers 27 are not engaged upon the cam surface. The brackets 51 carry ball bearing rollers 29 in rolling contact with the push rods 26 for permitting of the free and easy reciprocating movement of the push rods 26 through the brackets 51 in accordance with the motion imparted thereto by the control cam 16. The push rods at their outer ends are pivoted to the actuating forks or cranks 30, the pivots being shown at 31. Springs 32 are arranged to urge the push rod stops against the brackets 51 and the rollers 27 against the surface of control cam 16. The actuating forks or levers 30 are pivoted at 52 to the head 3' and such levers are bifurcated to embrace the guides 18. The ends of each bifurcation are forked as shown at 33. The forks are slidable in grooves 53 of plugs 34. These plugs are carried by the sides of the cylinders 8 by means of bolts 35. The bolts, as shown in Figure 1, are such as to permit the plugs to rotate on the bolts 35 during the oscillating movement of the levers 30. Plugs 34 slide up and down in slots 54 in the guides 18.

Referring to Figure 7, the control cam 16 is formed with a slot 36. As shown in Figure 2, a collar 37 is fitted in this slot whereby the cone cam 16 can rotate while the collar 37 remains relatively stationary; or whereby the collar 37 may rotate while the control cam 16 idles.

As shown in Figure 2, bolts 38 at their inner ends engage the collar 37 and pass slidably through the head 3' and the flange 5. Suitable packing boxes 40 are mounted about the rods 38 at the flange 5. The outer ends of the bolts or rods 38 are attached to the flange of a collar 41 slidably mounted on the drive shaft 4. The collar is grooved to receive ring 42 operatively connected with lever 43.

In operation, it will be seen that when the control cam 16 is in the position shown in Figure 2 the largest diameter of this cam is in contact with the rollers 27 of push rods 26 and that consequently the cylinders 8 will be given the maximum movement of the actuated cranks 30, and moving outwardly from the center through the guides 18 will close the ports 44 of the cylinders 8 by bringing the reduced areas 11 and 12 in the outer edges of said cylinders 8 over the packing rings 10 of heads 7. In this position, there being no escape for the fluid entrapped in the cylinders 8, the pressure on the pistons 19 is exerted through the connecting rods or links 21, the ball bearing rollers 22 to the periphery of the driving cam 14, thereby causing the driven shaft 4' to rotate. In this position the mechanism acts as a clutch and the driven shaft 4' is caused to rotate at substantially the same number of revolutions as the driving shaft 4. In other words the driver and follower are locked together in a direct drive.

Consider now the control cam 16 as having been shifted by the shifting lever 43 to the other limit of its movement. In other words consider that the control cam 16 in Figure 2 has been moved over to its extreme left hand position. Then the small end of cam 16 does not contact the rollers 27 of push rods 26 and no movement will be exerted by cone cam 16 on the push rods. Therefore the springs 32 will hold the stops 28 against brackets 51 and there will be no movement of the cylinders 8, the cylinders remaining in their innermost position, leaving the port area 44 open to its maximum. The fluid in the drum will have free passage with the movement of pistons 19 without exerting any pressure on the driving cam 14. Therefore the driving shaft 4 will carry the drum 1 around while the driven shaft 4' remains stationary.

Consider now an intermediate position of the cone or control cam 16. In such position the push rods 26 will be given a reduced throw, and the cylinders 8 will consequently have a reciprocating movement in radial directions but of restricted scope whereby the port area 44 will only be reduced at each pressure stroke of the pistons to the restriction required to exert sufficient pressure against the driving cam 14 to cause the driven shaft 4' to revolve at any speed desired.

Peep-holes 45 and filler plugs 46 are provided in the drum. The plugs 46 may be removed for the purpose of filling the drum with water or other filler desired at any time. The peep-holes 45 will show the condition of the fluid level in the drum during the operation and will indicate the need of replenishment at any time.

A suitable packing gland 47 is provided between driven shaft 4' and the head 3. The packing glands 40 and 47 will retain the fluid in the drum when stationary and not in use. When in operation, centrifugal force will cause the fluid to press against the outer portion of the drum and there will be an open space in the center around the shafts 4 and 4'. If the heads 7 and the plugs 46 are made tight there will be no way for fluid to escape and the operation may continue indefinitely without the addition of further fluid.

At each inward movement of the pistons 19, the cylinders 8 controlled by the cone cam 16 will leave the full open area at 44. Under centrifugal force the fluid in drum 1 will fill the cylinders and press against the heads of the pistons 19. At each outward stroke of the pistons, the area 44 will be reduced or restricted to form sufficient pressure against the piston to rotate the driven shaft 4'.

The working cam 14 is a progressive cam as shown in Figure 3. The shape of this cam makes possible, first, the outward movement of two of the four pistons before the other two pistons start inward, thus, crossing centers as it were maintaining a constant pressure from the drive to the driven member.

It also maintains a constant pressure at any position on the progressive or driving side of the cam between the drive and the driven members. Also, the movement of the pistons from this cam is diametrically in opposite directions to and from the center which maintains a constant balance of all the moving parts permitting the device to be used as a balance wheel for the driving force.

The cone-shaped cam 16 operates in synchronized position with the above driving or working cam 14 and controls and regulates the closing and opening of the ports at the outer ends of the cylinders. The cone-shaped cam 16 operates in synchronized position with the above working cam but has a lead in advance of working cam.

It will be noted that the outer portions of the cylinders are substantially non-restricted. There is a full area opening in the cylinders while the same are being filled.

The cylinders are not filled by vacuum but by centrifugal force exerted on the fluid within the drum. Thus, the faster the drum turns or revolves, the greater the force applied to fill the cylinders, and under this centrifugal force nothing but fluid is permitted to enter the cylinders as all lighter fractions, such as air and gases are driven inwardly, the heavier particles being thrown outwardly, consequently the mass of the fluid entering the cylinders is dense as compared with fluid not operated upon by centrifugal force. This dense mass of fluid is substantially non-compressible which is a desirable condition in fluid for transmission and clutch purposes because of the fact that it avoids variation in the speed between the drive and the driven members. This condition will also eliminate any possibility of heat from compression.

Under centrifugal force there will be a greater pressure exerted on the outer surface of piston head than by the fluid on the inner surface, thus not only balancing the weight of the piston but also having a tendency to press the pistons inwardly and their rollers 22 against the periphery of working cam 14, reducing the work performed by the coil springs 26'.

All of the vital moving parts are mounted on ball bearings which are practical to operate with water lubrication, although oil may be the fluid medium or a mixture of oil and water may be used.

Adverting to the stops 28 on push rods 26, when these stops are moved radially inward by the springs 32 to the extent that they engage brackets 51, further inward radial movement of push rods 26 and rollers 27 will cease. In other words, the stops suspend the movement of the push rods when the cylinders 8 have attained their maximum opening. When the cam 16 is positioned so that the smaller end of the cam 16 is not in contact with push rod rollers 27, the rollers 27 are suspended by the stops 28 against the brackets 51 and need not contact the cam at all in this position. It will be seen, when in this position, the area 44 is opened to the fullest extent and remains so.

While the cone-shaped cam 16 operates in constant position with drive cam 14, this cam 16 is so set with relation to cam 14 so as to move the cylinders before the pistons 19 are actuated by cam 14. By reference to Figure 6, and the lines shown thereon, the lead of the cam 16 is shown, the lead being the circumferential area on cam 16 by which the action of this cam precedes the action of the working cam 14.

Cam 16 is a conic section viewed axially as in Fig. 7. Viewed circumferentially as in Fig. 6 the cam has high and low points 16ª and 16ᵇ respectively. The lines 16ᶜ bounding the high and low points are shown in Fig. 7 to be struck along lines that converge toward the small end of the conic cam; this in order that the arcs of the low points 16ᵇ shall diminish in length from the larger end of the conic cam to the smaller end thereof in proportion to the diminishing lengths of the high points 16ª. In other words as the diameter of the conic cam changes from one end of the cam to the other, the arcuate lengths of the high and low points 16ª and 16ᵇ must vary in proportion.

In Fig. 2, the rollers 27 rest upon the low points 16ᵇ of the cam at the end of the conic cam having the greatest diameter. On rotation of shaft 4 the rollers 27 will ride up on the high points 16ª, thus pushing out arms 30 and cylinders 8 to a maximum outer position of the cylinders 8 where the ports 44 are completely closed. The lead of cam 16 over cam 14 will cause closing of cylinder ports 44 before the pistons 19 start outward in the cylinders 8. But if the ports 44 are completely closed and the cylinders previously filled with non-compressible fluid from which air and the like are removed by the centrifugal action, then the pistons 19 cannot move out in cylinders 8 except there be leakage between the movable parts and the rollers 22 at the ends of the connecting rods 21 react on the surface of cam 14 to carry cam and follower shaft 4' around with drive shaft 4. The shafts 4 and 4' are thus locked to rotate at substantially the same speeds together. Consequently the rollers 27 controlling the cylinders 8 of the two opposed pistons 19 exerting pressure between the heads 7 and the periphery of cam 14 remain on the high points 16a of cone cam 16 and direct drive between the driver shaft 4 and the follower or driven shaft 4' is obtained when in this position. The rollers 27 controlling the cylinders 8 of the other two opposed pistons 19 are opposite the low points 16b and cam 16 and the springs 32 hold the rollers 27 against the low points 16b and the ports 44 of these two opposed pistons are open and these cylinders, under centrifugal force of fluid rotating in drum are being filled with fluid. Thus it will be seen that if account of leakage by packing rings 20 in pistons 19 or by the packing rings 10 in heads 7, the two opposed pressure bearing pistons 19 should move outward to the extreme of high points on cam 14, the other two opposed pistons will have reached the low points of cam 14 thus filling these cylinders to capacity and the cam 16, revolving with cam 14, will have closed the ports 44 and because of the advance or lead of cam 16 over cam 14 and the design of cam 14, these pistons will have assumed the load before the first two pistons have released it. Thus while there may be a variation of naught to one or more turns per minute between the driving shaft 4 and the driven shaft 4', there will be a constant pressure exerted between these shafts, one pair of opposed pistons taking up the load before the other opposed pair of pistons have released it.

When cam 16 is shifted to an intermediate position along the shaft 4' so that the high points 16a of the cam at this part of its conic section are not high enough to move cylinders 8 all the way out to meet heads 7, then the ports 44 will not be fully closed; and, when the cam 14 follows the action of cam 16 the pistons 19 may move outward in the cylinders 8 at a rate of speed dependent on the size of port area 44. This will allow a certain slippage of rollers 22 on cam 14 and hence a lag of follower shaft 4' behind the speed of drive shaft 4. The further cam 16 is adjusted to the left in Fig. 2, the wider will be the openings of ports 44 and the less speed transmitted to follower shaft 4'.

In any position of cam 16 except at the extreme left and the complete disengagement of follower or driven shaft 4' from the driver shaft 4 and where the follower shaft 4' lags behind the drive shaft 4 there will be relative rotation of cam 16 with respect to rollers 27; thus causing rollers 27 to ride in and out on the high and low points 16a and 16b. This will result in the radial reciprocation of cylinders 8 as the drum rotates. The pistons 19 carried around in the cylinders 8 will reciprocate radially in the cylinders 8 due to the relative movement of the rollers 22 over the surface of cam 14. Due to lead of cam 16 over cam 14 the cylinders 8 will be moved out to the position of selected port area before the pistons 19 start on their outward movement. Consequently the transmission reduction in speed of the follower shaft 4' is that selected by the axial position of cam 16 along the extension 15 of follower shaft 4'. The low points 16b allow cylinders 8 to be drawn in, thus exposing wide port areas 44 at the time pistons 19 are moving inwardly, whereby to avoid formation of vacuum which would tend to hold pistons 19 in the outer positions and draw rollers 22 off surface of cam 14. The reengagement of the rollers 22 with cam surface 14 would were this latter condition to obtain no doubt be attended with noise and clutch chattering and possible damage to the parts. Any pulsating movement which might take effect in the follower shaft 4' due to this reciprocation of the cylinders 8 and the pistons 19 is offset by the plurality of cylinders and pistons, which work in diametric pairs.

It will be noted that due to lead of cam 16, cylinders 8 are moved radially in to thus unrestrictedly open ports 44 to completely relieve vacuum from pistons 19 when they begin to move radially inward.

The invention makes practical use of the law of centrifugal force for the purpose of filling the cylinders with de-aerated liquid whereby to create greater clutch efficiency.

It is obvious that various changes and modifications may be made in the details of construction and design of the above specifically described embodiment of this invention without departing from the spirit thereof, such changes and modifications being restricted only by the scope of the following claims.

What is claimed is:

1. In an improved power transmission and clutch, drive and driven members, a drum for containing fluid fixed to one member, abutments on the drum, cylinders carried around with the drum and movable relatively to the drum toward and from said abutments, pistons mounted to reciprocate in said cylinders, cam connections between said pistons and the other member, and means for causing the automatic reciprocation of the cylinders toward and from the abutments concurrently with the rotation of the drum, said means including means for controlling the throw of movement of said cylinders relatively to said abutments and also including means to suspend the reciprocating movement of the cylinders when said first-named means is positioned to disconnect the driven member from the drive member.

2. In an improved power transmission and clutch, drive and driven members, a drum for containing fluid fixed to rotate with one member, abutments on the drum, cylinders carried around with the drum and movable relatively to the drum toward and from said abutments, said cylinders having open ends closed or restricted in port area by said abutments, pistons mounted to reciprocate in said cylinders, cam connections between said pistons and the other member, means connected between said cylinders and members for reciprocating the cylinders toward and from said abutments automatically as the drum rotates whenever a differential in speed occurs between the drive and driven members, said means including means for varying the degree of the reciprocating movement of said cylinders to control the port area at the abutments, said means timed with respect to the movement of the pistons whereby the cylinders will be moved away from the abutments relieving the restriction to the filling of the cylinders during the inward strokes of said pistons, said first-named means including means for holding the cylinders without reciprocation substantially a maximum distance from said abutments when the first-named means is positioned to disconnect the driven from the drive member whereby the pistons will be free to reciprocate in said cylinders without impedance from any fluid trapped in said cylinders.

3. In an improved power transmission and clutch, drive and driven members, a drum containing fluid fixed to rotate with one member, a cam fixed to rotate with the other member, cylinders carried around with said drum and having a reciprocating movement with respect to the drum, said cylinders being open at their outer ends, abutments carried by the drum toward which the outer open ends of said cylinders are adapted to move, pistons reciprocating in said cylinders, rollers connected to said pistons and bearing on the periphery of said cam, means for urging the rollers against the cam surface, and means for reciprocating said cylinders, said last named means including means for varying the reciprocating throw of said cylinders.

4. In an improved power transmission and clutch, drive and driven members, a drum for fluid connected fixedly to one member, a cam fixed to the other member, cylinders carried about with said drum and having a reciprocating movement relatively to the drum, said cylinders having outer open portions, abutments on the drum toward which the outer open portions of said cylinders are adapted to move, pistons mounted to reciprocate in said cylinders, rollers yieldably urged against said cam and connected to the pistons, and means to reciprocate said cylinders, said means including a slidable cone cam with means to slide the cam to vary the throw of said cylinders.

5. In an improved power transmission and clutch, drive and driven members, a drum for fluid connected to one member, a cam fixed to the other member, cylinders rotatable with said drum and reciprocating with respect to the drum, said cylinders having open outer ends, abutments for receiving the open outer ends of the cylinders when in their outermost positions, pistons reciprocating in said cylinders, rollers yieldably urged against the cam and connected to said pistons, and means to reciprocate said cylinders, said means including a cone cam slidably mounted to vary the throw of said cylinders, said cone cam having circumferentially elongated high points and minor low points, said first mentioned cam having major low points and circumferentially minor high points, the high and low points of the two cams being so angularly set that the cylinders will be rapidly shifted to outer position prior to outer movement of the respective pistons.

6. In an improved power transmission and clutch, drive and driven members, a drum containing fluid carried around with one of said members, a cam fixed to the other member, cylinders carried about by said drum and reciprocating with respect to the drum, said cylinders having ports, the movement of said cylinders adapted to open and close said ports, means for reciprocating said cylinders including a cam struck on a conic section, push rods movably mounted in the drum and bearing on the surface of said conic cam, means for shifting the conic surface of said cam with reference to said push rods to vary the throw of the push rods, levers connected to said push rods and to said cylinders, pistons in said cylinders, and means connected to said pistons and bearing on the surface of the first mentioned cam and moved thereby on differential circumferential motion between said members.

7. In an improved power transmission and clutch, drive and driven members, a drum fixed to move with one member and containing fluid, cylinders carried around with said drum and having reciprocating movement with respect to said drum, said cylinders having ports opened and closed by the reciprocating movement thereof, means for reciprocating said cylinders including reciprocating push rods, guide brackets on the drum for guiding the movements of said push rods, said brackets and push rods having stop means therebetween to limit the inward motion of said push rods, spring means acting on said push rods to yieldably move the same inwardly, levers pivoted to said push rods and to said drum and connected to move said cylinders, a movably mounted cone cam engaged by the inner portions of said push rods, means for shifting said cam, pistons in said cylinders, a working cam on the driven member, and means yieldably pressed against the surface of said working cam and connected to said pistons.

8. In an improved power transmission and clutch, drive and driven members, a drum secured to move with one of said members, a working cam secured to move with the other member, an extension on the driven member beyond said working cam, a cone control cam secured to rotate with the driven member and slidable axially on said extension, means to shift said control cam, reciprocating cylinders carried about with said drum, means moved by said control cam for reciprocating said cylinders, pistons in said cylinders, means connected to said pistons and bearing on said working cam, said cylinders having ports opened and closed by the reciprocation thereof.

9. In an improved power transmission and clutch, drive and driven members, a fluid drum fixed to move with one of said members, bearings in said drum for receiving an end portion of the driven member, a working cam in said drum fixed to the driven member, a control conic cam in the drum fixed to rotate with said driven member but slidable thereon and moving concentric with said working cam, means extending to the exterior of the drum for causing axial shifting movement of said conic cam, cylinders carried about with said drum and reciprocating in said drum, means for reciprocating said cylinders acted on by said control cam, pistons movably mounted in said cylinders, and means connected to the pistons bearing yieldably against the surface of said working cam.

10. In an improved power transmission and clutch, drive and driven members, a fluid drum moving with one of the members, bearings in the drum for receiving an end portion of the other member, a working cam fixed on the driven member, a control cone cam sliding on the driven member but fixed to rotate therewith, guides fixed in the drum, cylinders mounted to reciprocate radially in said guides, levers pivoted in the drum having forked parts for reciprocating said cylinders, means projecting from the cylinders slidably engaged by said forks, connections between said levers and the conic cam, pistons movably mounted in said cylinders, and means connected to the pistons for yieldingly bearing against said working cam, said cylinders having ports opened and closed by the reciprocating movement thereof.

11. In an improved power transmission and clutch, drive and driven members, a fluid drum connected to one member, a working cam fixed to the other member, a conic control cam driven by the driven member but slidable axially of the same, cylinders carried about by said drum and reciprocating in the drum, means actuated by said conic cam for reciprocating said cylinders, said cylinders having ports opened and closed by the reciprocating action of said cylinders, pistons reciprocating in said cylinders, and means connected to said pistons and bearing yieldably on the surface of said working cam, said working cam having diametrically opposed high points to cause outward movement of said pistons in diametric pairs, said working cam being so shaped as to complete the outward movement of two diametric pistons before the other two pistons at right angles thereto start inward thus maintaining a constant pressure from the drive to the driven member and also maintaining a constant pressure at any position on the progressive or driving side of the working cam between the drive and the driven member, said cone control cam occupying a synchronized position with said working cam and having a lead corresponding with but in advance of the lead on the working cam.

WILLIAM D. HUFF.